(12) United States Patent
Bain (10) Patent No.: US 7,738,364 B2
(45) Date of Patent: Jun. 15, 2010

(54) SCALABLE, HIGHLY AVAILABLE CLUSTER MEMBERSHIP ARCHITECTURE

(76) Inventor: William L Bain, 10968 NE. 24th St., Bellevue, WA (US) 98004

( * ) Notice: Subject to any disclaimer, the term of this patent is extended or adjusted under 35 U.S.C. 154(b) by 1210 days.

(21) Appl. No.: 11/074,164

(22) Filed: Mar. 7, 2005

(65) Prior Publication Data

US 2006/0291459 A1    Dec. 28, 2006

Related U.S. Application Data

(60) Provisional application No. 60/551,837, filed on Mar. 10, 2004.

(51) Int. Cl.
*G01R 31/08*    (2006.01)
*G06F 11/00*    (2006.01)

(52) U.S. Cl. ................ 370/228; 370/242; 714/2
(58) Field of Classification Search ........... None
See application file for complete search history.

(56) References Cited

U.S. PATENT DOCUMENTS

| | | | |
|---|---|---|---|
| 6,535,990 B1 * | 3/2003 | Iterum et al. ........... | 714/4 |
| 7,116,674 B2 * | 10/2006 | Shi ........................ | 370/419 |
| 7,356,578 B1 * | 4/2008 | Eatough .................. | 709/223 |
| 2002/0167898 A1 * | 11/2002 | Thang et al. ............ | 370/216 |
| 2004/0153558 A1 * | 8/2004 | Gunduc et al. .......... | 709/229 |
| 2005/0063383 A1 * | 3/2005 | Wisler .................... | 370/389 |

* cited by examiner

*Primary Examiner*—Nittaya Juntima
(74) *Attorney, Agent, or Firm*—James L Davison (57) ABSTRACT

The invention comprises a software-based communications architecture and associated software methods for establishing and maintaining a common membership among a cluster of multiple, cooperating computers (called hosts). The invention incorporates the use of nearest neighbor and overlapping heartbeat connections between clustered computers that are logically organized in a linear or multi-dimensional array. This arrangement of heartbeat connections has two principal advantages. First it keeps the cluster membership highly available after host failures because hosts can quickly detect and recover from another host's failure without partitioning the membership. Second, it enables the cluster membership to scale to large numbers (e.g., hundreds) of computers because the computational and message passing overhead per host to maintain the specified heartbeat connections is fixed and the underlying physical network is allowed to scale. This membership architecture is well suited to distributed applications (such as a partitioned database) in which changes to the workload are made and propagated cluster-wide by neighboring hosts for purposes of load-balancing.

4 Claims, 13 Drawing Sheets

SCALABLE, HIGHLY AVAILABLE CLUSTER MEMBERSHIP ARCHITECTURE

CROSS-REFERENCE TO RELATED APPLICATIONS:

This application claims the benefit of Provisional patent application Ser. No. 60/551,837, filed Mar. 10, 2004 by the present inventor.

BACKGROUND

The present invention comprises a software-based communications architecture and associated software methods for establishing and maintaining a common membership among multiple, cooperating computers. A membership refers to a set of computers, called hosts herein, which are members of a cooperating group, called a cluster. (A computer refers to a typical computing system consisting of one or more CPU's, memory, disk storage, and network connections.) Each host maintains a list, called a membership list, that enumerates this host's view of the set of the hosts within a cluster, also called the cluster set, and it modifies the list as it detects that other hosts have joined or left the group. A host can voluntarily leave the group or it involuntarily leaves after it suffers a failure and ceases to communicate with other hosts. The membership lists of various cluster hosts may temporarily differ as notifications of cluster set changes propagate among the hosts.

All hosts need to quickly update their membership lists as cluster set changes occur so that the membership lists quickly converge to the same contents in all cluster hosts. This property, called coherency, of the cluster membership enables the cluster to closely coordinate its actions, for example, to partition and distribute a shared workload among cluster members and to redistribute the work as necessary after a cluster set change occurs. An example of a shared workload is a database table that is partitioned across a cluster set based on a lookup key for the purposes of parallel searching or sorting. At a minimum, it is necessary that the hosts be able to quickly detect any single host's failure and update their membership lists to re-establish their coherency and thereby repartition the shared workload. Quick recovery minimizes disruption in processing the workload. It is also desirable that the hosts to be able to detect and recover from multiple, simultaneous host failures. A cluster membership that quickly detects and recovers from host failures so as to maintain useful processing of its workload is said to be highly available.

Figure 1:
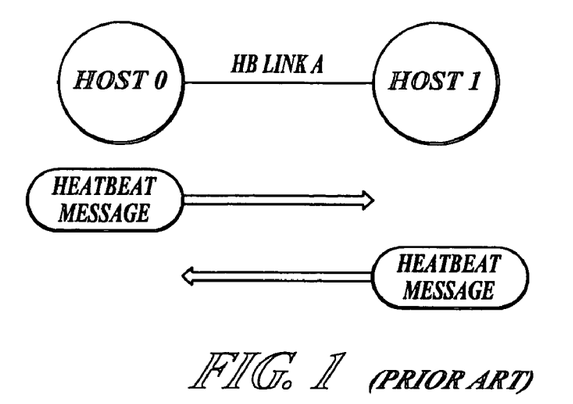
FIG. 1 shows two cluster hosts with a heartbeat connection.

Highly available clusters employ a variety of techniques to increase their tolerance to failures. For example, reliable communications protocols and redundant networking hardware (e.g., adapters, switches, and routers) reduce the likelihood of communications failures, and redundant storage components (e.g., RAID drives) reduce the probability of storage failures. However, host failures may occur and must be quickly detected so that recovery can be initiated and useful processing can resume. A well known technique for detecting host failures is to use periodic message exchanges, called heartbeat connections, between hosts to determine the presence and health of other hosts. Cluster hosts periodically (e.g., once per second) send and receive heartbeat messages using a computer network that is shared among the hosts. For example, FIG. 1 shows two hosts exchanging heartbeat messages over a heartbeat connection (also called a heartbeat link herein). Minimizing the period between heartbeat messages allows hosts to detect failures more quickly and to keep the cluster membership more coherent. However, heartbeat connections add networking and computational overheads, and shorter heartbeat periods have larger overheads.

An important challenge in constructing a highly available cluster membership is to enable the membership list to efficiently grow and support large numbers (i.e., hundreds) of hosts while maximizing the membership's coherency after cluster set changes. A cluster membership that has this property is said to be scalable. To make a cluster membership scalable, it is highly desirable that the overhead associated with heartbeat connections grows less quickly than the number of hosts. In addition, bottlenecks to scaling, such as the need for a fully shared, fixed bandwidth networking medium, should be avoided. As an example, a cluster membership in which each host has a heartbeat connection with all other members would not scale efficiently because the number of periodic heartbeat messages exchanged by the hosts would grow quadratically (that is, proportional to the square of the number of hosts).

Figure 2:
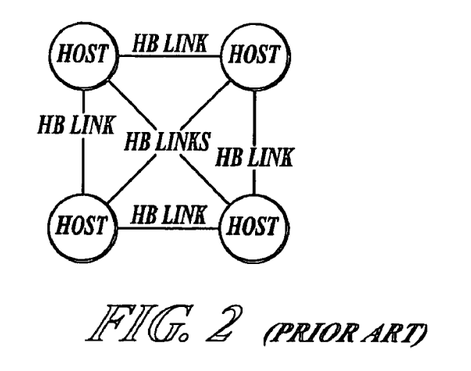
FIG. 2 is an example of four cluster hosts with heartbeat links between all host pairs.

A typical method for establishing a cluster membership in small clusters (typically, two to four hosts) with is for each host in the cluster to have a heartbeat connection with all other hosts. For example, FIG. 2 shows a cluster set with four hosts and six heartbeat links. The hosts can detect whenever a change in the cluster set occurs. As noted above, the overhead required for each host to maintain membership list in this manner grows nonlinearly with the size of the cluster set. To reduce this overhead, heartbeat messages may be broadcast or multicast to all other hosts. In this case, the message traffic still grows linearly with the number of hosts. However, this approach requires that the computer network provide efficient hardware support for multicast, and the use of a shared network switch to support multicast can become a bottleneck since the switch's bandwidth is fixed. To avoid the use of multicast, all heartbeat connections can connect to a single "master" host within the cluster analogous to attaching the spokes on a wheel to its axle. This arrangement unfortunately makes the master host a single point of failure and bottleneck for the entire cluster. Hence, these communications architectures have inherent limitations that keep them from scaling to handle large cluster set sizes.

To avoid these difficulties, large cluster memberships (e.g., with hundreds of hosts) are often created by loosely aggregating many individual hosts or small clusters (called subclusters) whose memberships may be maintained in a manner such as that described above. To minimize overhead, these large "peer-to-peer" memberships do not maintain periodic heartbeat connections between sub-clusters. As a result, the global cluster membership can become partitioned and/or the membership lists may diverge for long periods of time when cluster set changes occur. This method for maintaining a cluster membership is not sufficiently coherent to closely coordinate the actions of all cluster members in partitioning a shared workload. It is this limitation of the prior attempts for large cluster memberships that the invention seeks to remedy.

Figure 3:
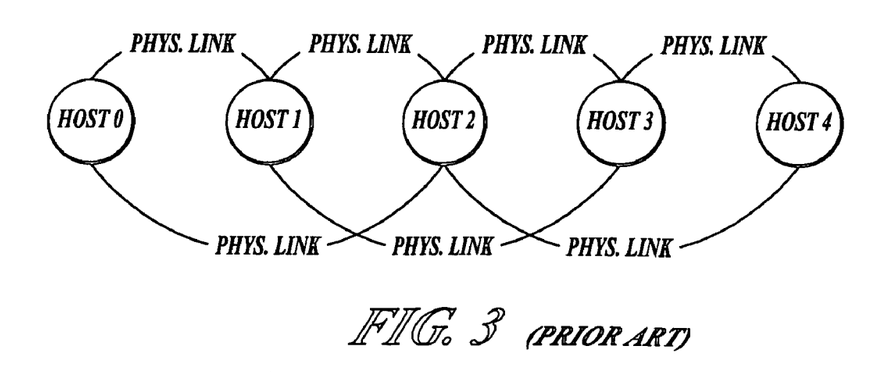
FIG. 3 is an example of a prior art five host cluster with overlapping physical communication links.

It is important to distinguish the invention described herein from the prior attempts in the design of physical networks for communications between computers. In the prior attempts, such as in the design of parallel supercomputers, physical point-to-point computer interconnection networks have been proposed or implemented which contain nearest neighbor and multi-hop interconnections. For example, the interconnection network in FIG. 3 shows nearest neighbor and multi-hop physical communication links between hosts. These computer networks have been devised to allow the efficient construction of networking hardware to support large numbers of interconnected computers. However, these networks strictly represent a physical communications medium and do not specify a software architecture or message communication pattern that implements an intended behavior. In contrast, the invention describes a software architecture for constructing heartbeat connections between computers for the purpose of detecting and recovering from host failures in order to construct a scalable, highly available cluster membership. The heartbeat connections communicate over an unspecified underlying physical network, for example, a network such as that shown in FIG. 3, a shared Ethernet switch, a crossbar network, a mesh backplane, as some examples.

SUMMARY

The present invention is directed to a system that connects multiple computers (called hosts) in a network. These hosts engage in periodic message exchanges (called heartbeat links) to determine the health of neighboring hosts and to thereby establish and maintain a list of communicating hosts (called a cluster membership). The present invention employs a first set of heartbeat links connecting adjoining (nearest neighbor) hosts together in a linear arrangement as an example and with a second set of heartbeat links (called overlapping heartbeat links) connecting hosts to other hosts adjoining the adjoining (nearest neighbor) hosts. In other words, each overlapping heartbeat link skips over the adjoining (nearest neighbor) host to connect to the host on the other side of the adjoining (nearest neighbor) host. When a host fails, an adjoining heartbeat link allows the failed host's first adjoining neighbor to detect the failed host and to establish a heartbeat link with (a) the failed host's second adjoining neighbor as its nearest neighbor and also with (b) the second adjoining neighbor's adjoining neighbor, thereby skipping over the failed host and maintaining the integrity of the set of heartbeat links that connect together all unfailed hosts in a continuous chain. The failed host's second adjoining neighbor also establishes a heartbeat link with the failed host's first adjoining neighbor as its nearest neighbor and with the adjoining neighbor of the failed host's first adjoining neighbor. This reestablishes the system of single hop and multi-hop (overlapping) heartbeat links that was present before the failure of a host. A first heartbeat link may also connect adjoining hosts as explained above and then use a second heartbeat link to hop over multiple adjoining hosts thereby connecting hosts that have multiple intervening hosts between them. Any linear or multi-dimensional host network construct of connecting hosts using both adjoining heartbeat links and overlapping heartbeat links within each dimension of the network are within the scope of this invention.

DETAILED DESCRIPTION

This section first describes the preferred embodiment of present invention and then describes its rationale and benefits.

Description

Figure 4:
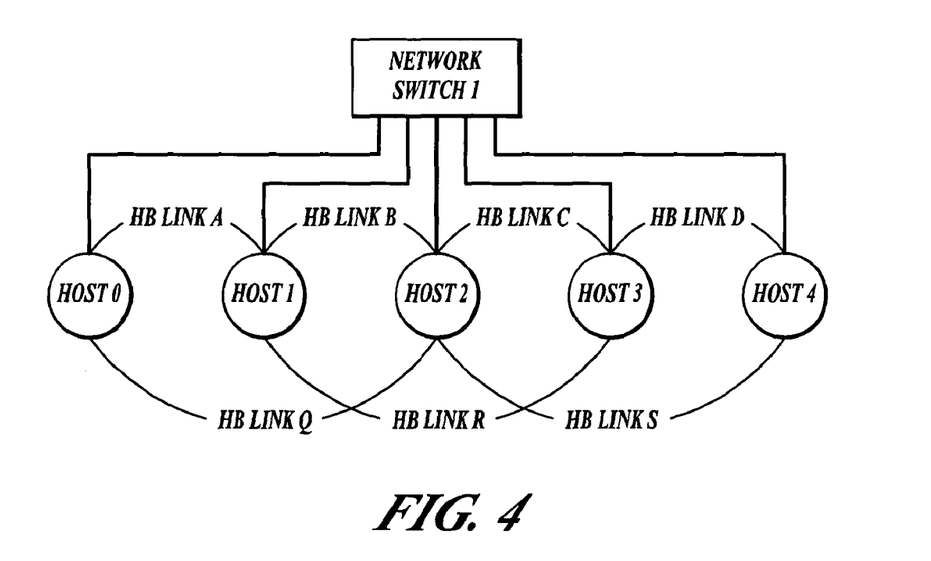
FIG. 4 shows a five host cluster with overlapping logical heartbeat connections that communicate by using a shared physical network switch.
Figure 5:
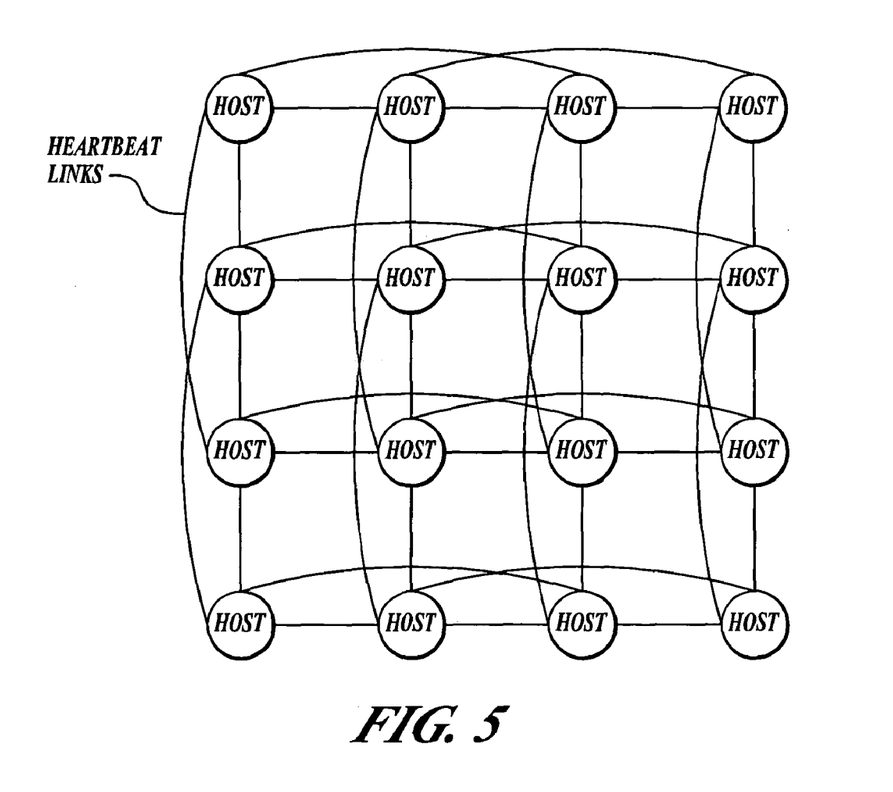
FIG. 5 shows an example of a two-dimensional two-hop array of heartbeat connections with sixteen cluster hosts.

The present invention constructs a scalable, highly available membership by logically organizing hosts into a single or multidimensional array with both nearest neighbor and overlapping heartbeat connections between the hosts. An overlapping heartbeat connection is defined as a connection that spans more than a single (neighbor) host in the array. For example, a two-hop connection spans three hosts and passes over one intermediate host; in general, an M-hop overlapping connection spans M+1 hosts. The simplest embodiment of the invention is a one-dimensional, two-hop array, which employs both nearest neighbor and two-hop heartbeat connections. As an example, FIG. 4 shows a one dimensional, two-hop array of five hosts labeled host 0 through host 4, all of which communicate using a shared network switch. Each host has one heartbeat connection (also called a heartbeat link) to its immediate predecessor and another to its immediate successor. For example, host 2 uses link B to connect to its immediate predecessor, host 1, and it uses link C to connect to its immediate successor, host 3. In addition, host 2 has a heartbeat connection to its secondary predecessor, host 0, using link Q, and host 2 has another heartbeat connection to its secondary successor, host 4, using link S. In other embodiments, the hosts could be arranged in an N-dimensional mesh (to optimize load-balancing for N-dimensional load distributions), in which case each host would have nearest neighbor and overlapping connections in each dimension of the array. For example, FIG. 5 shows a two dimensional, two-hop array. Alternative embodiments also could use M-hop connections where M is larger than two, and they could also incorporate multiple M-hop connections for differing values of M (to improve fault-tolerance in case of multiple, neighboring host failures). These embodiments are contained within the scope of the invention. The software methods described herein describe how to construct one dimensional, two-hop arrays of heartbeat connections. The present invention also includes the capability of connecting hosts in three dimensions wherein the adjoining hosts are all the hosts next to and surrounding the target host.

Rationale and Benefits

Figure 6:
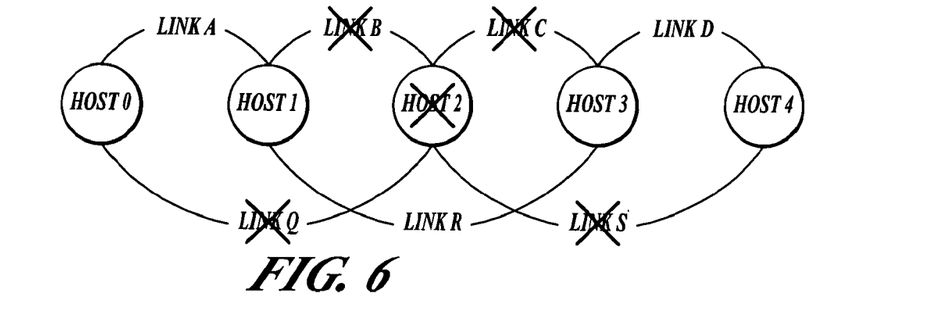
FIG. 6 shows an example of a failed host and its associated failed heartbeat connection links.
Figure 7:
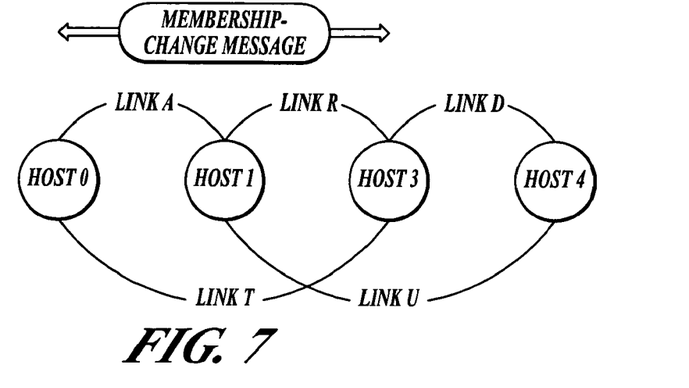
FIG. 7 is an example of a cluster's recovery after host 2 shown in figure fails.

The use of overlapping heartbeat connections allows the hosts to directly and quickly detect and recover from the failure of a neighboring host within the cluster without partitioning the cluster membership. This enables the cluster membership to remain highly available in the presence of a host's failure. For example, FIG. 6 shows the failure of host 2 and its associated heartbeat connections, links B, C, Q, and S. In this example, host 1 and host 3 use the failed heartbeat connections to detect the failure of host 2 and maintain the cluster membership with each other using the overlapping heartbeat connection, link R, which now serves as a non-overlapping heartbeat connection between host 1 and host 3. The presence of the overlapping connection, link R, prevents the cluster membership from becoming partitioned by the failure of host 2. Host 1 and host 3 update their membership lists to remove failed host 2, and they communicate the failure of host 2 to their neighboring hosts, host 0 and host 4. As shown in FIG. 7, the surviving hosts (0, 1, 3, and 4) create new, overlapping heartbeat connections T and U to complete the cluster's recovery after the failure of host 2.

Unlike the prior attempts, the invention allows a highly available cluster membership employing heartbeat connections to efficiently scale to large numbers (e.g., hundreds) of hosts. Because each host has a fixed number of heartbeat connections, the overhead required to maintain the cluster membership does not increase as the cluster set grows. In the embodiment described in FIG. 4, each host has four or fewer heartbeat connections under normal operations plus one additional heartbeat connection when a host is joining the cluster. Cluster hosts communicate membership changes (i.e., a list of newly joined, departed, and failed hosts) to distant hosts by sending additional membership-change messages to neighboring hosts. For example, FIG. 7 shows host 1 sending membership-change messages after its neighboring host fails. These messages reliably propagate to all hosts because the two-hop overlapping heartbeat connections ensure that the cluster membership never becomes partitioned due to a single host failure or a single network connection failure. Unlike heartbeat messages which are sent periodically, membership-change messages are only sent after a membership change occurs, and this adds insignificant overhead that does not affect scaling. Although the time required to re-establish the global coherency of the cluster membership increases with the cluster set's size (due to the latency in propagating membership-change messages to all hosts), the time needed to re-establish local coherency among neighbors with heartbeat connections is fixed and very short, and it is unaffected by scaling the cluster. This method for maintaining cluster membership is well suited to applications (such as a distributed partitioned database) in which load distribution changes can be incrementally made and propagated by neighboring hosts to more distant hosts in the cluster.

Figure 8:
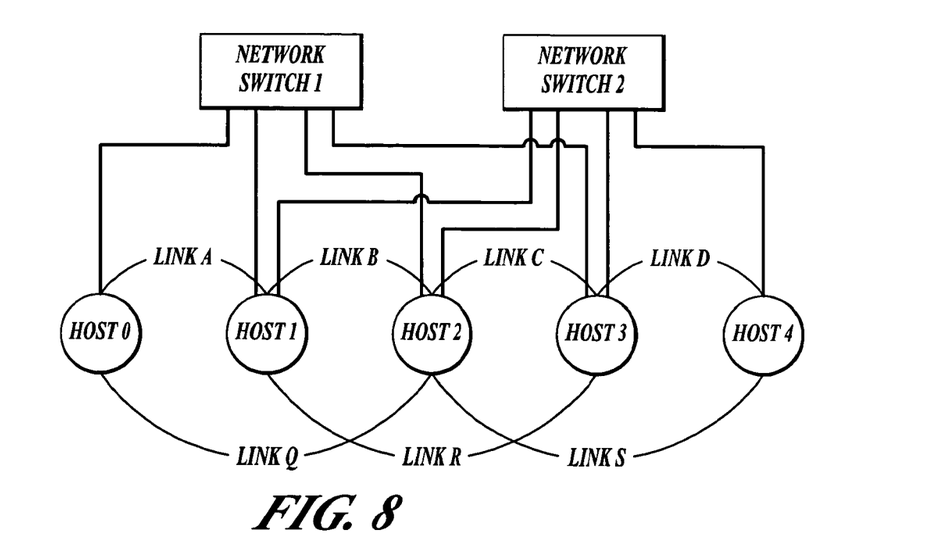
FIG. 8 is an example of using multiple network switches in a cluster with overlapping heartbeat connection links wherein hosts 1, 2 and 3 use multiple network interfaces.

The invention also allows the hosts to use multiple networking switches so that the network's bandwidth can scale as the size of the cluster set grows. This ensures that the network's bandwidth does not become a bottleneck to scalability for the cluster membership. FIG. 8 shows the example embodiment of FIG. 8 with two networking switches. In this example, hosts 1, 2, and 3 require two hardware network interfaces to connect to both networking switches. Networking switches can be added whenever the number of hosts on one switch approaches the bandwidth capacity of that switch. A host need only have direct connections (for example, through a switch) to other hosts with which it has heartbeat connections. Hence, it must have a network interface to all switches to which those hosts are connected. In the single dimensional, two-hop embodiment shown in FIG. 5, each host needs a maximum of two network interfaces.

Software Methods for One Embodiment of the Invention

Figure 9:
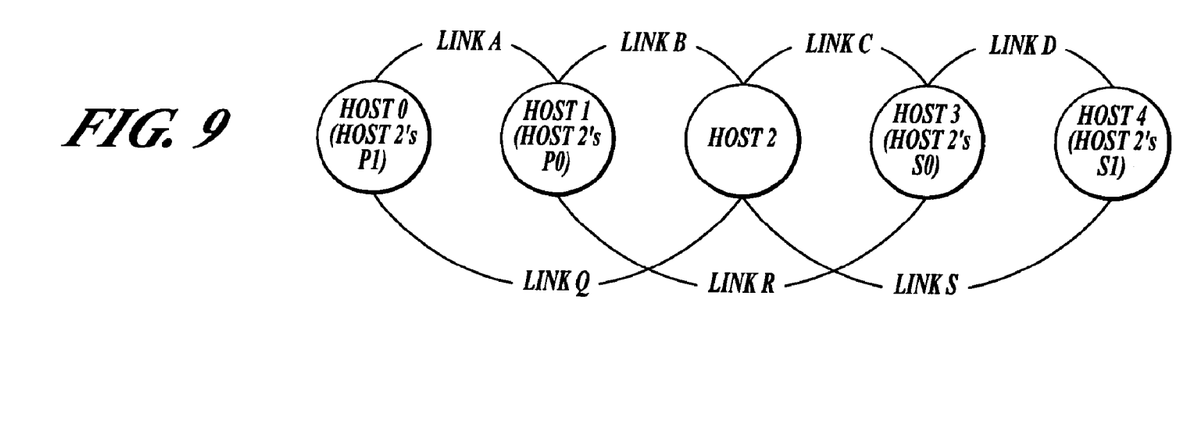
FIG. 9 shows an example of a cluster showing predecessor and successor host denotations for host 2.

The following software methods apply to a single dimensional, two-hop embodiment of the invention in which neighboring hosts have heartbeat connections that are interconnected linearly, and each host has one overlapping heartbeat connection to its secondary predecessor and an overlapping heartbeat connection to its secondary successor (if those hosts exist). An example of this embodiment with five hosts is shown in FIG. 4. The following nomenclature is used to simplify the description of the software methods. The a host's immediate successor in the linear arrangement of hosts is denoted its S0, and its secondary successor is denoted its S1. Likewise, a host's immediate predecessor is denoted its P0, and its secondary predecessor is denoted its P1. An example of these link denotations is shown in FIG. 9. In this Figure, host 3 is host 2's S0, host 4 is its S1, host 1 is its P0, and host 0 is its P1. A host's list of host identities for its P1, P0, S0, and S1 neighbors is called its neighbor list. It is possible to construct software methods for a multi-dimensional embodiment with multiple, M-hop heartbeat connections, and these methods would be within the scope of this invention.

The software methods described are distributed software methods, i.e., the algorithms are distributed across multiple hosts which exchange messages to coordinate their actions. The complete software method to implement a function is therefore represented by multiple flowcharts, each of which is run on a specific host. The software methods assume that messages are sent using a reliable transport protocol that preserves message ordering from a single sender to a single receiver. Also, the software methods do not describe the details of building and maintaining a heartbeat connection between two hosts. The techniques for building heartbeat connections are well understood. It is assumed that the implementation allows a heartbeat connection can be initiated by either host or concurrently by both hosts.

The present invention incorporates the following software methods that enable a host to join and leave an existing cluster. Note that these software methods have overlapping functionality because they require a common locking and synchronization mechanism. The invention also incorporates a software method that enables the cluster to detect and recover from the failure of a host.

Algorithm for a Host to Join a Cluster

Figure 10:
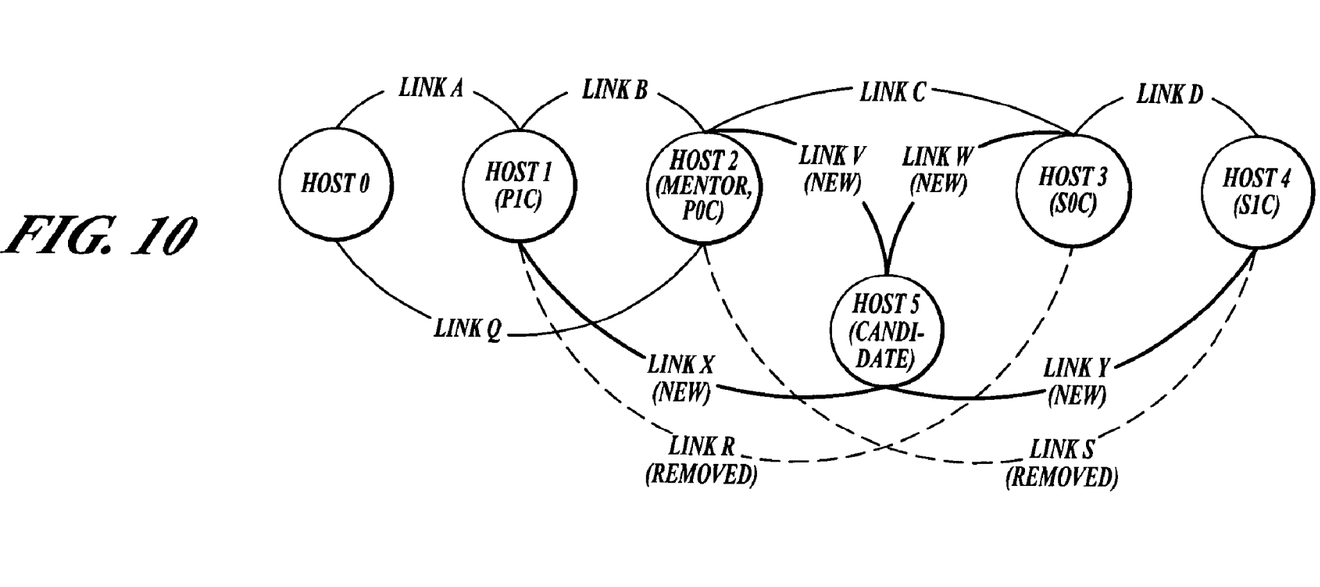
FIG. 10 is an example of a candidate joining a cluster.

A host that wishes to join a cluster and become part of the cluster set is called a candidate host. It identifies a host that is a member of the cluster set to which it initially communicates; this host is called the mentor host, and it is selected by management policy. After the candidate host joins the cluster, it becomes the immediate successor to the mentor host. For example, FIG. 10 shows a cluster in which host 5 has joined the cluster shown in FIG. 3. In this example, host 5 is the candidate host, and host 2 is its mentor host. After host 5 joins the cluster, new heartbeat connections V, W, X, and Y have been created, and heartbeat connections R and S have been terminated.

Figure 11:
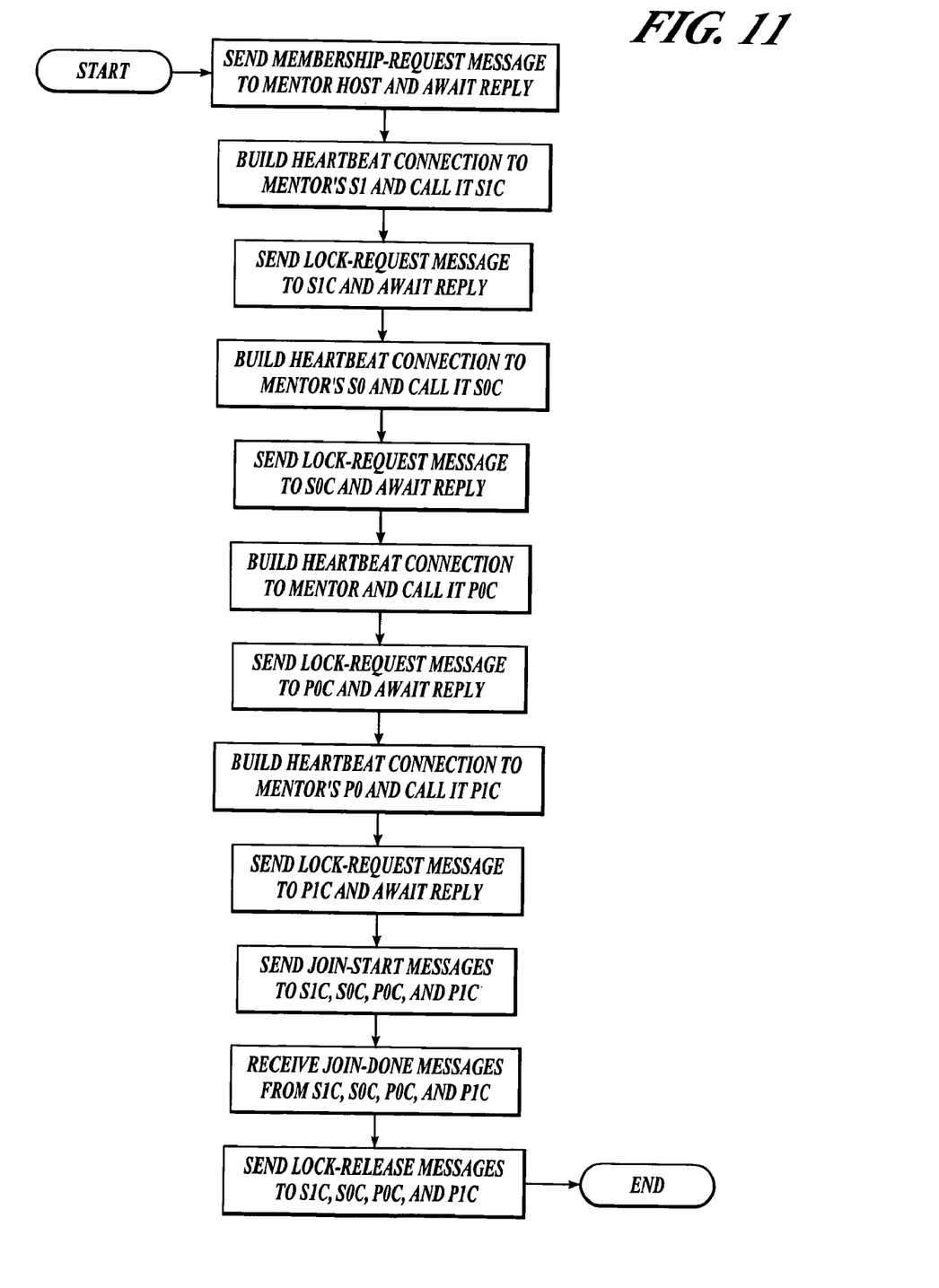
FIG. 11 is a flowchart showing a candidate host's software method of joining a cluster.

To join the cluster, the candidate host executes the software method shown in FIG. 11. The candidate host first determines its mentor host's S0, S1, and P0 by sending a membership-request message to the mentor host and awaiting a membership-reply message which contains the mentor host's neighbor list (i.e., the host identifiers for its S1, S0, P0, and P1 neighbors). It then initiates a heartbeat connection with the mentor host's S1, which is denoted the candidate's S1C, and sends a lock-request message to S1C. (The method used by hosts to build and maintain a heartbeat connection is not described herein.) This lock-request message is used to give the candidate host exclusive use of S1C in case other candidate hosts are simultaneously attempting to join or leave the cluster. After receiving a lock-reply message from host S1C, which indicates that S1C has been successfully locked, the candidate host next initiates a heartbeat connection with the mentor host's S0, which is denoted the candidate's S0C, and sends a lock-request message to S0C. After receiving a lock-reply message from S0C, the candidate repeats this process with the mentor host and finally with the mentor host's P0, respectively which are denoted the candidate's P0C and P1C. The lock requests are always initiated in the same order (i.e., S1C, S0C, P0C, and P1C in this software method) in order to prevent deadlock when multiple hosts concurrently join and/or leave the cluster. Note that in some cases, not all of these four neighbor hosts exist. For example, host 0 has no predecessor hosts in the example in FIG. 10.

After the candidate host receives lock reply messages from all neighbor hosts, it sends join-start messages to these hosts to signal them to drop an existing heartbeat connection that is to be replaced by the new heartbeat connection to the candidate host. For example, in FIG. 10, host 3 drops its overlapping heartbeat connection to host 1 (link R) when host 5 joins the cluster and creates a heartbeat connection (link W) to host 5. The specific link changes are as follows. The candidate host's S1C drops its P1 connection, S0C drops its P1 connection, P0C drops its S1 connection, and P1C drops its S1 connection. After the candidate host receives join-done messages from all neighbor hosts (S1C, S0C, P0C, and P1C in the example in FIG. 6), it sends lock-release messages to these neighbor hosts. The candidate host has now joined the cluster.

Figure 12:
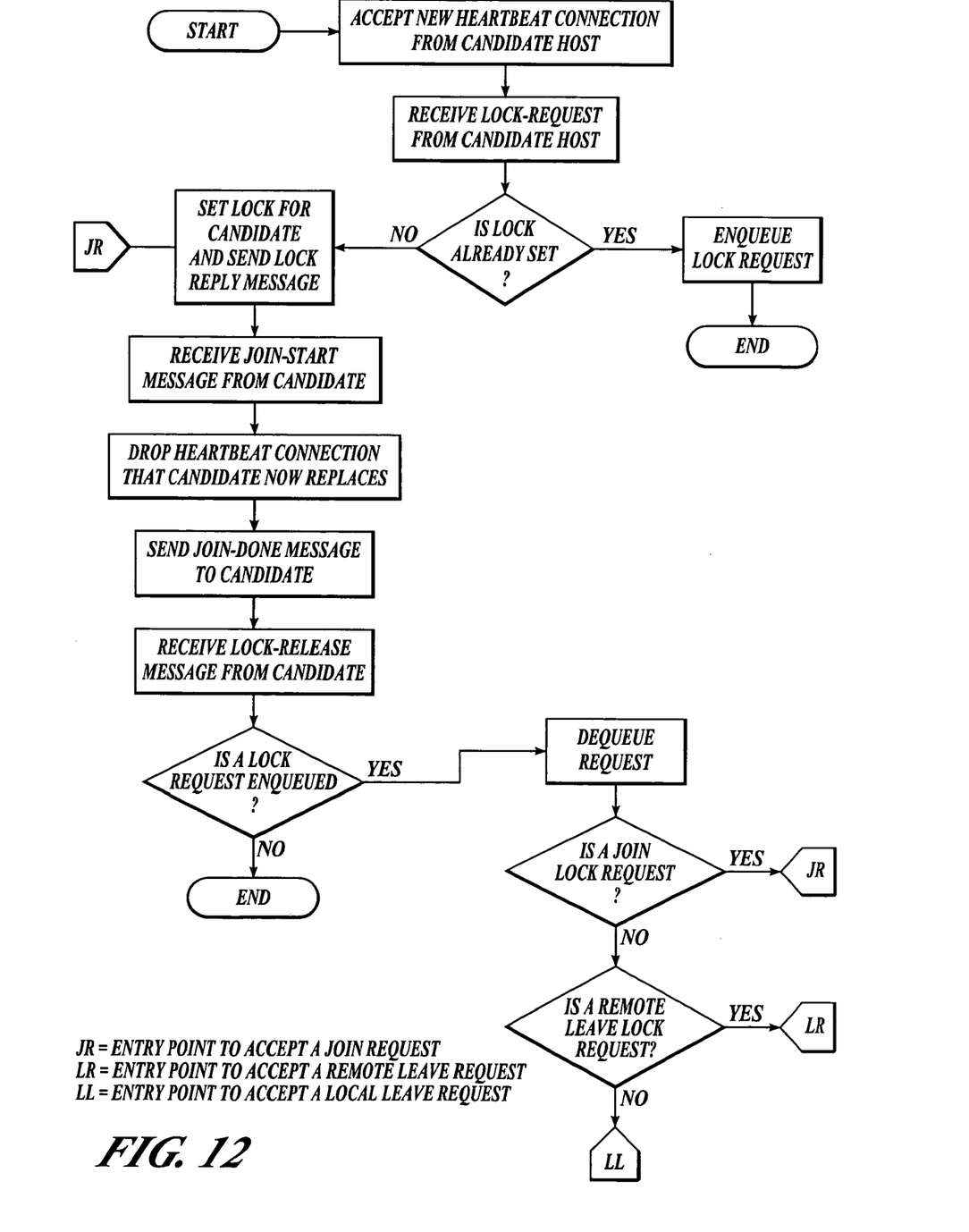
FIG. 12 is a flowchart showing a cluster host's software method of accepting a candidate's join request.
Figure 13:
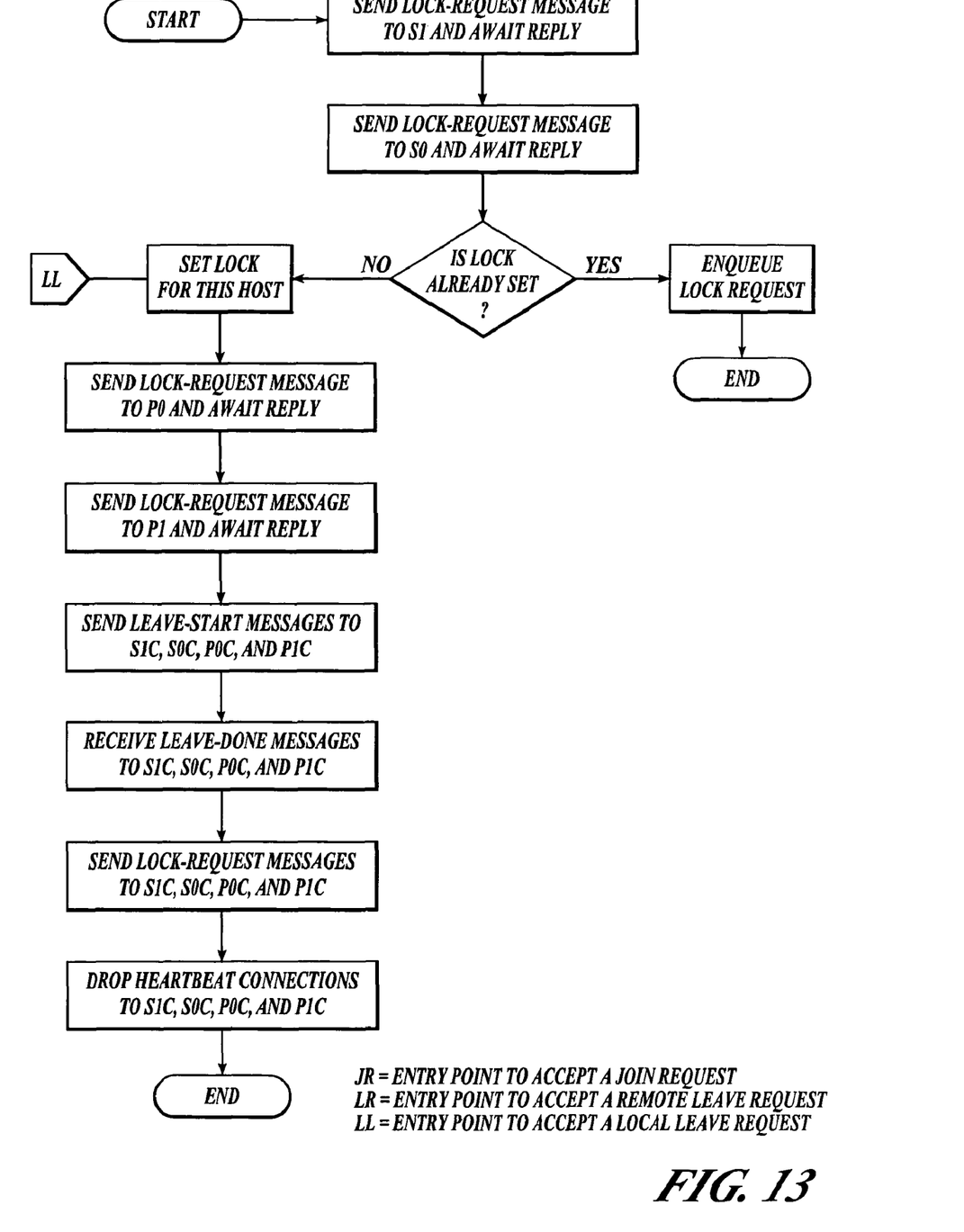
FIG. 13 is a flowchart showing a leaving host's software method to leave a cluster.
Figure 15:
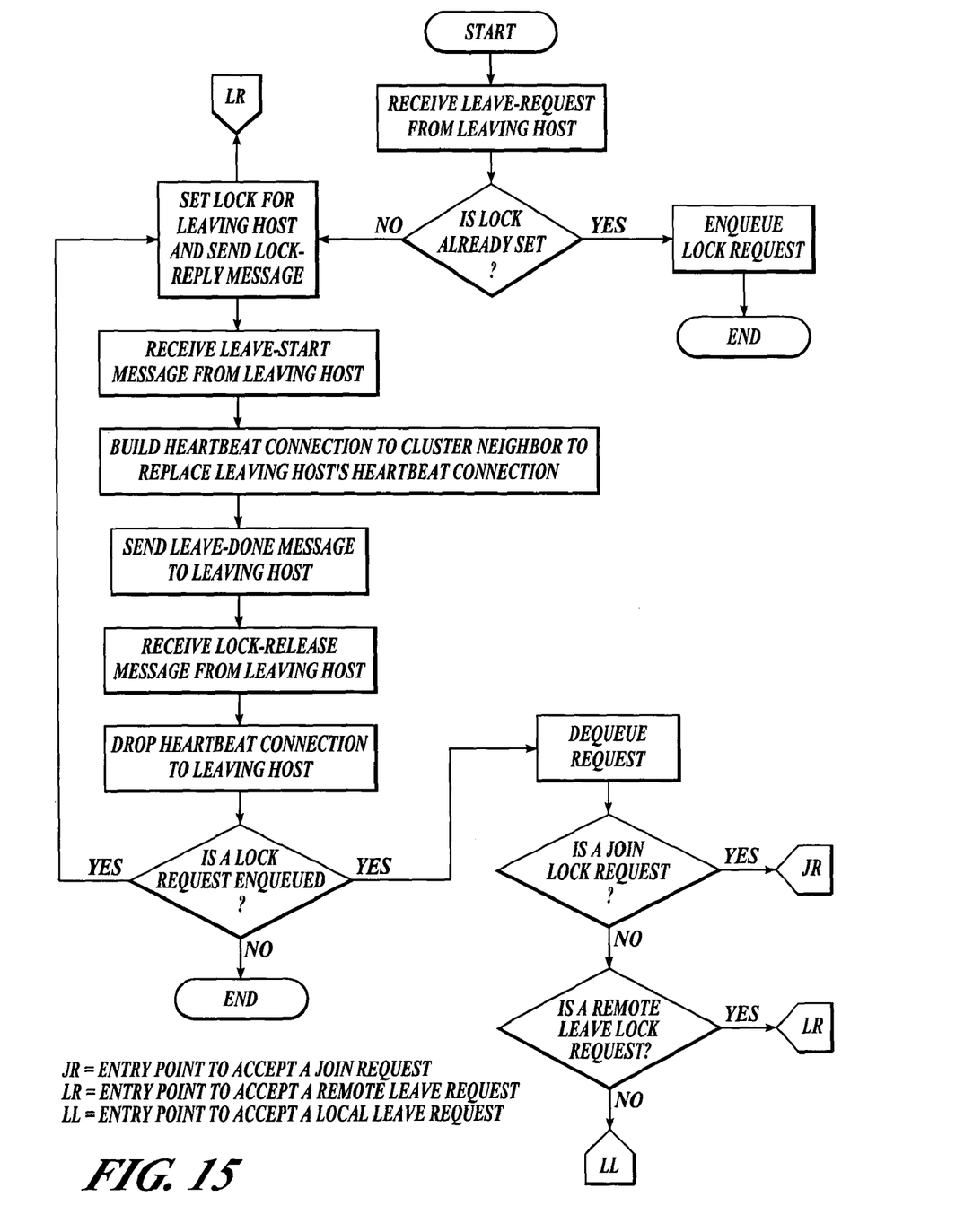
FIG. 15 shows a flowchart of a cluster host's software method to accept a leaving host's leave request.

When a candidate host joins the cluster, the existing hosts to which it communicates execute the software method shown in FIG. 12. First, the mentor host receives a membership-request message from the candidate host and sends a membership-reply message with the host identifiers for its S1, S0, P0, and P1 neighbors. (Because this step is executed only by the mentor host, it is not shown in FIG. 12.) A host first receives and accepts a new heartbeat connection from the candidate host. The host receiving a lock-request message from the candidate host checks whether the host has already been locked by another candidate or by a neighboring host that is leaving the cluster or by the host itself in preparation for leaving the cluster. If the lock is in use, the candidate's lock request is enqueued, and no reply is sent. Otherwise, the host is locked on behalf of the candidate, and a lock-reply message is sent to the candidate. When the host receives a join-start message from the candidate, it drops a heartbeat connection to another host that is now to be replaced by the candidate's heartbeat connection. (The heartbeat connection to be dropped is specified above in the description of the candidate's software method.) The host then sends a join-done message to the candidate host. When the host receives a lock-release message from the candidate host, it clears its lock and checks whether another lock request was enqueued while the host was locked. If so, the enqueued lock request is dequeued and handled as if it were a new lock request. Otherwise, the join software method is completed. If the dequeued lock request is a new join lock request, the software method transfers control to its entry point JR. Otherwise, if the dequeued lock request is a new remote leave request, the software method transfers control to a different software method, which is shown in FIG. 15, at entry point LR. Otherwise, the dequeued lock request must be a new local leave request, and the software method transfers control to a different software method, which is shown in FIG. 13, at entry point LL.

Algorithm for a Host to Leave a Cluster

A cluster that wishes to leave an existing cluster is called a leaving host. This host executes the software method shown in FIG. 13. First it sends a lock-request message to its S1 host and awaits a lock-reply message from this host. Next it sends a lock-request message to its S0 host and awaits a lock-reply message from this host. The leaving host then attempts to set its local host lock. If the lock is already in use, the lock request is enqueued and the software method suspends execution until the lock request can be serviced at entry point LL, as shown in FIG. 13. Next it sends a lock-request message to its P0 host and awaits a lock-reply message from this host, and finally, the leaving host sends a lock-request message to its P1 host and awaits a lock-reply message from this host. The lock requests are always initiated in the same order (i.e., S1, S0, local host, P0, and P1 in this software method) in order to prevent deadlock when multiple hosts concurrently join and/or leave the cluster. Note that in some cases, not all of these four neighbor hosts exist.

Figure 14:
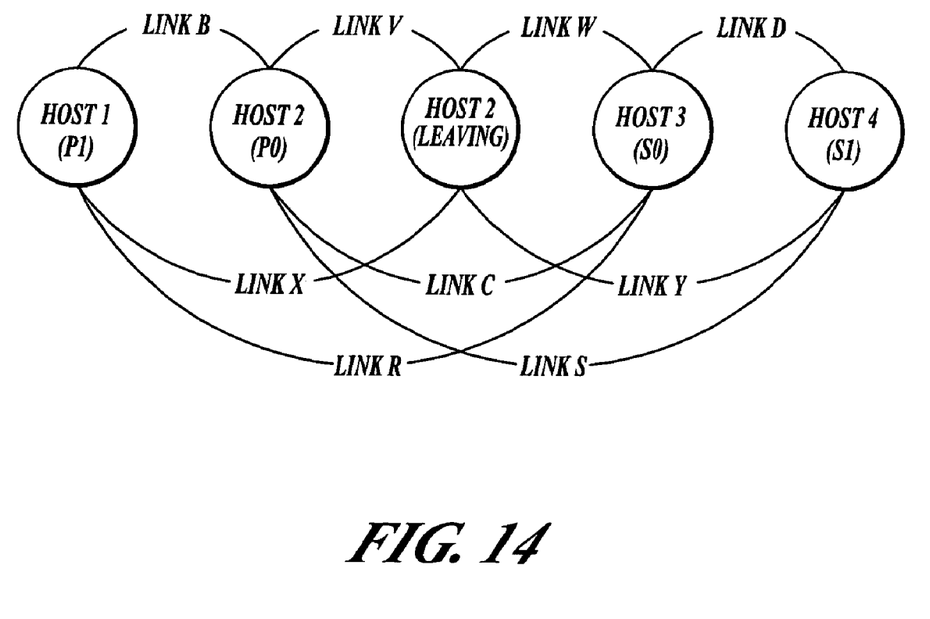
FIG. 14 shows a example of a host leaving a cluster.

After the leaving host receives lock reply messages from all neighbor hosts, it sends leave-start messages containing its S1, S0, P0, and P1 identities to these hosts to signal them to add a new heartbeat connection to another host that is to replace the leaving host's heartbeat connection. For example, FIG. 14 shows host 5 leaving a cluster (that it had previously joined in the example in FIG. 10). In this example, host 1 creates an overlapping heartbeat connection (link R) to host 3 and drops its heartbeat connection (link X) to leaving host 5. Similarly, host 4 creates an overlapping heartbeat connection (link S) to host 2 and drops its heartbeat connection (link Y) to host 5. The specific link changes are as follows. The leaving host's S1 builds a new P1 connection to the leaving host's P0 and drops its existing P1 connection. S0 builds a new P1 connection to the leaving host's P1 and drops its P0 connection. P0 builds a new S1 connection to the leaving host's S1 drops its S0 connection. Finally, P1 builds a new S1 connection to the leaving host's S0 and drops its S1 connection. After the leaving host receives leave-done messages from all neighbor hosts (S1, S0, P0, and P1), it sends lock-release messages to these neighbor hosts and drops its heartbeat connections to them (links V, W, X, and Y in FIG. 14). The leaving host has now left the cluster. Note that if the leaving host has enqueued lock requests, it sends special lock-reply messages back to the requestors requesting that they resubmit their lock requests to existing hosts.

When a leaving host leaves the cluster, the existing hosts to which it communicates execute the software method shown in FIG. 15. A host first receives a lock-request message from the leaving host, it checks whether the host has already been locked by a candidate host or by a neighboring host that is leaving the cluster or by the host itself in preparation for leaving the cluster. If the lock is in use, the leaving host's lock request is enqueued, and no reply is sent. Otherwise, the host is locked on behalf of the leaving host, and a lock-reply message is sent to the leaving host. When the host receives a leave-start message from the leaving host, it builds a heartbeat connection to another host that is now to replace the leaving host's heartbeat connection. (The heartbeat connection to be created in specified above in the description of the leaving host's software method.) The host then sends a leave-done message to the candidate host. When the host receives a lock-release message from the leaving host, it clears its lock and drops its heartbeat connection to the leaving host. It then checks whether another lock request was enqueued while the host was locked. If so, the enqueued lock request is dequeued and handled as if it were a new lock request. Otherwise, the leave software method is completed. If the dequeued lock request is a new join lock request, the software method transfers control to a different software method, which is shown in FIG. 12, entry point JR. Otherwise, if the dequeued lock request is a new remote leave request, the software method transfers control to its entry point LR. Otherwise, the dequeued lock request must be a new local leave request, and the software method transfers control to a different software method, which is shown in FIG. 13, at entry point LL.

Algorithm for a Cluster Host to Recover from a Failed Host

Figure 16:
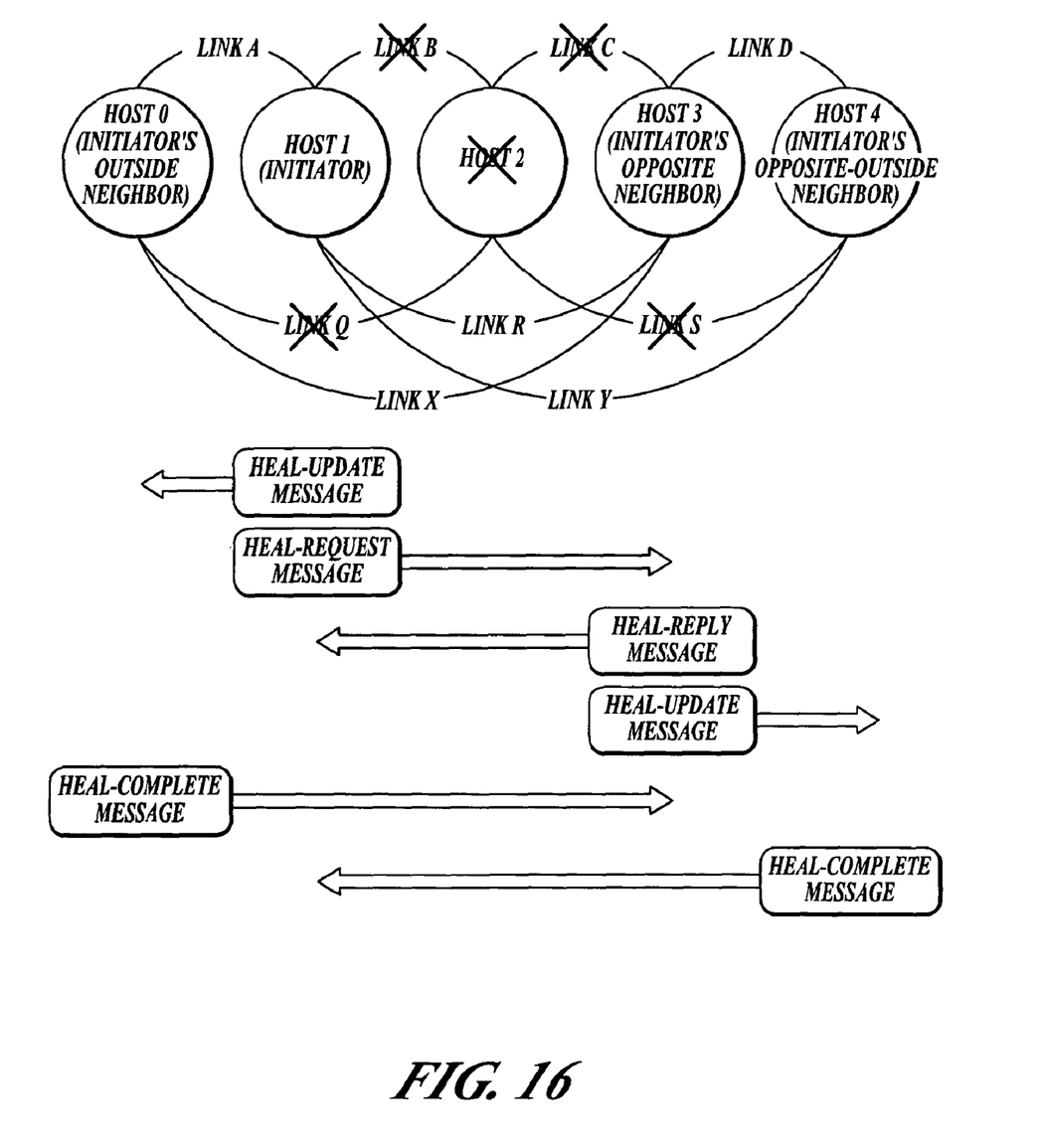
FIG. 16 shows an example of a cluster recovering from a failed host.

When a host suffers a failure, its neighboring hosts detect the failure using their heartbeat connections. These hosts must recover by building new, overlapping heartbeat connections that restore the two-hop connectivity and exclude the failed host. For example, FIG. 16 shows a cluster in which host 2 and its associated heartbeat connections (links B, C, Q, and R) have failed. Host 0 must build a heartbeat connection to host 3 (link X in the Figure), and host 4 must build a heartbeat connection to host 1 (link Y). Note that link R changes its role from an overlapping heartbeat connection to a nearest neighbor connection between host 1 and 3.

The software method for recovering (also called healing herein) from a host failure can be designed to execute by any one of the failed host's four neighbors (i.e., its P1, P0, S0, or S1). The following software method initiates recovery from the nearest neighbor P0, if it exists; this host is called the initiator. The software method can execute symmetrically to initiate from S0 in case P0 does not exist (i.e., in case the failed host is the leftmost host in the array). In this software method, a host that is the nearest neighbor on the opposite side of P0 (or S0) from the failed host is called P0's (or S0's) outside neighbor. For example, host 0 is host 1's outside neighbor, and host 4 is host 3's outside neighbor in FIG. 16. Also, the host that is the failed host's nearest neighbor on the opposite side from a host is called the opposite neighbor herein, and the opposite neighbor's outside neighbor is called the opposite-outside neighbor. For example, in FIG. 16, host 3 is host 0's and host 1's opposite neighbor, and host 1 is host 2's and host 3's opposite neighbor; likewise, host 4 is host 1's opposite-outside neighbor, and host 0 is host 3's opposite-outside neighbor.

Figure 17:
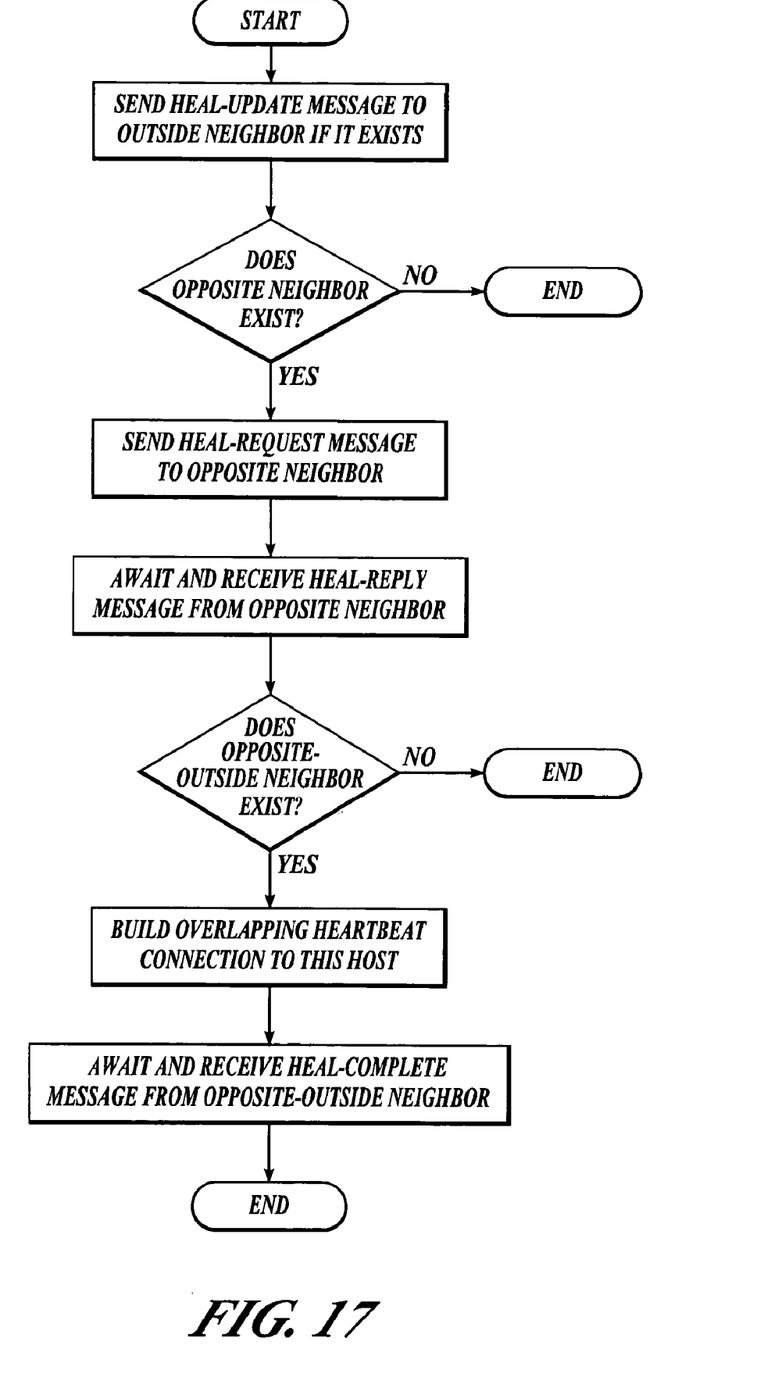
FIG. 17 is a flowchart of a neighbor host's software method to initiate healing of a cluster after a host failure.

FIG. 17 shows the software method to initiate healing. The initiator, which is usually the failed host's P0, first sends a heal-update message to its outside neighbor if that neighbor exists. If the initiator has an opposite neighbor, it sends the neighbor a heal-request message containing its neighbor list; otherwise, the software method terminates. The initiator then awaits a heal-reply message from its opposite neighbor. This message includes the opposite neighbor's list of neighbor hosts, and the initiator uses this list to build an overlapping heartbeat connection to its opposite-outside neighbor, if it exists. In the example of FIG. 16, initiator host 1 builds an overlapping heartbeat connection (link Y) to its opposite-outside neighbor host 4. Finally, the initiator awaits a heal-complete message from the new neighbor, and the software method terminates.

Figure 18:
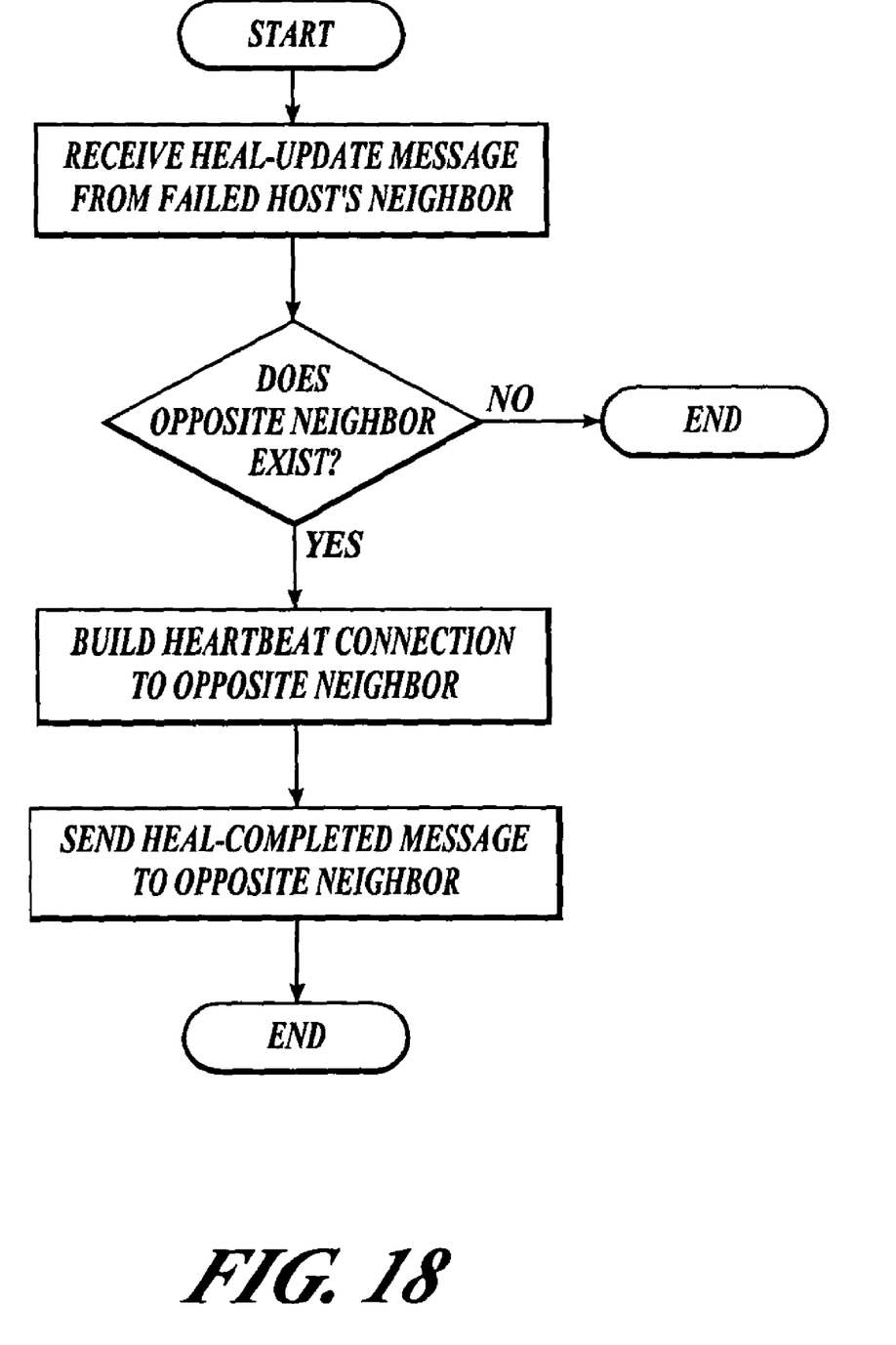
FIG. 18 is a flowchart showing an outside neighbor host's software method to complete healing of a cluster after a host failure.

FIG. 18 shows the software method that is executed by the initiator's outside neighbor and also by its opposite-outside neighbor, if these hosts exist. After the outside neighbor receives a heal-update message, it checks the neighbor list within the message to determine whether an opposite neighbor exists. If this host exists, the outside neighbor builds a new, overlapping heartbeat connection to the opposite neighbor and sends it a heal-complete message. This completes the outside neighbor's software method. In the example of FIG. 16, outside neighbor hosts 0 and 4 respectively build overlapping heartbeat connections (links X and Y) to their opposite neighbor hosts 3 and 1.

Figure 19:
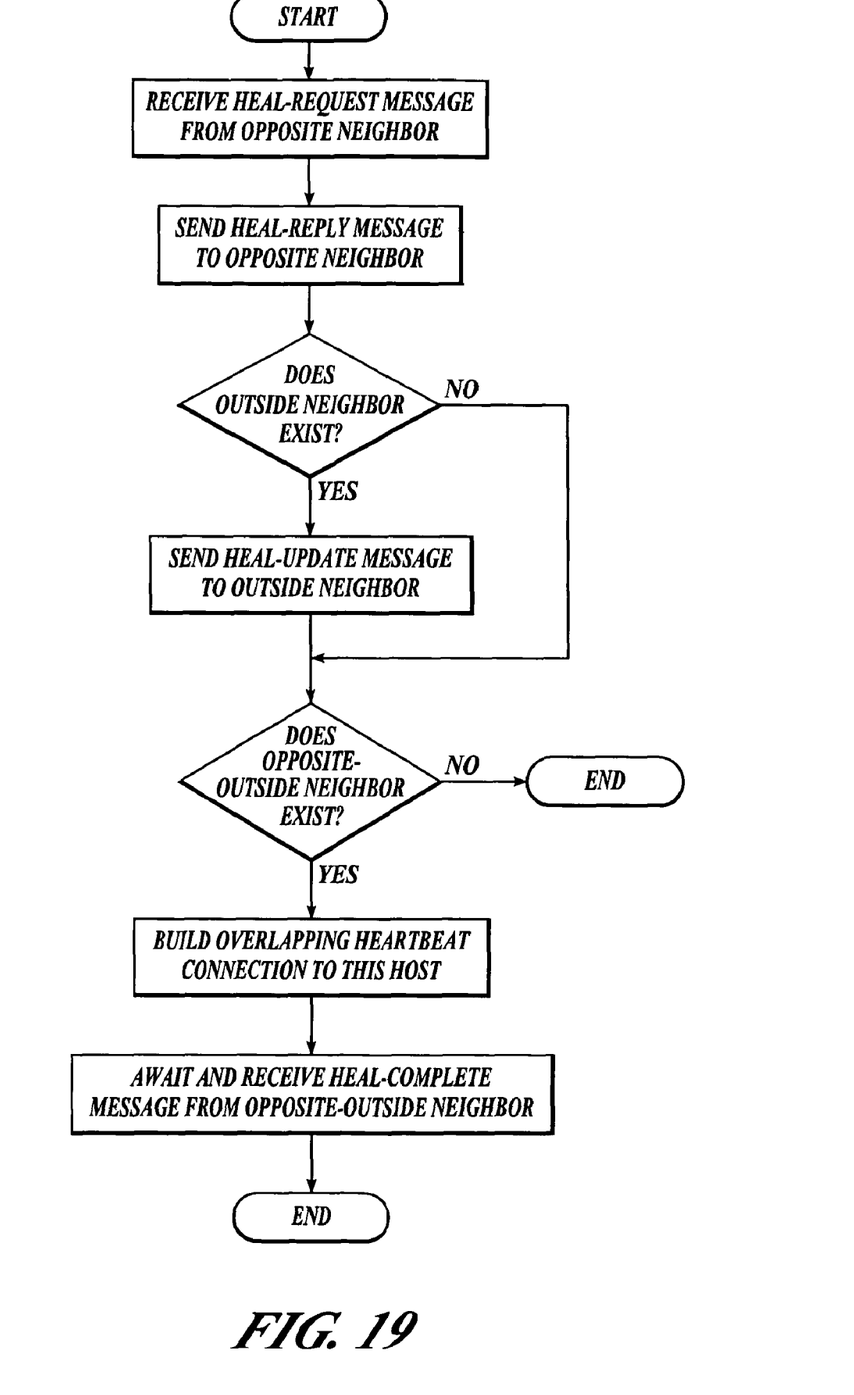
FIG. 19 is a flowchart showing an opposite neighbor host's software method to complete healing of a cluster after a host failure.

FIG. 19 shows the software method that is executed by the initiator's opposite neighbor upon receipt of a heal-request message. This host sends a heal-reply message back to the initiator, and this message contains the opposite neighbor's list of neighbor hosts. The initiator uses this list to determine whether to build a heartbeat connection to its opposite-outside neighbor (as described above for the initiator's software method). If the opposite neighbor has an outside neighbor, it sends a heal-update message to this host. The opposite neighbor next looks at the neighbor list that it received from the initiator to determine whether it has an opposite-outside neighbor. If this host exists, the opposite neighbor builds a new, overlapping heartbeat connection to its opposite-outside neighbor and awaits a heal-complete message from this host. In the example of FIG. 16, outside neighbor host 3 builds an overlapping heartbeat connection (link X) to its opposite-outside neighbor host 0.

The software methods shown in FIGS. 17-19 have a "race" condition that occurs because the order of arrival of a heal-complete message is indeterminate with respect to the arrival of a heal-request or a heal-reply message respectively at the opposite neighbor or initiator. Although the implementation of these software methods must handle this race condition, it does not modify the logic described in the software methods.

Therefore, although the invention has been described as setting forth specific embodiments thereof, the invention is not limited thereto. Changes in the details may be made within the spirit and the scope of the invention, said spirit and scope to be construed broadly and not to be limited except by the character of the claims appended hereto.

I claim:

1. A system connecting multiple hosts in a computing network by at least one heartbeat link to each host comprising:
    a) a first set of heartbeat links between said multiple hosts such that each host is connected by the heartbeat link to a first adjoining neighbor host and a second adjoining neighbor host; and
    b) a second set of heartbeat links between said multiple hosts such that each host is connected by a heartbeat link to the first adjoining neighbor host's adjoining neighbor host and to the second adjoining neighbor host's adjoining neighbor host; and
    c) wherein a failure of one of said multiple hosts comprises a resulting action of:
    d) the failed host's first adjoining neighbor host remaining connected by a heartbeat link to said failed host's second adjoining neighbor host; and
    e) the failed host's second adjoining neighbor host remaining connected by a heart beat link to said failed host's second adjoining neighbor host's second adjoining neighbor; and
    f) the failed host's first adjoining neighbor host, using said remaining connected heartbeat link from said first adjoining neighbor host to failed host's second adjoining neighbor host, and said remaining connected heartbeat link from said second adjoining neighbor host to said second adjoining neighbor host's adjoining neighbor host, to connect a new heartbeat link to said failed host's second adjoining neighbor host's adjoining neighbor host; and g) the failed host's first adjoining neighbor host remaining connected by a heartbeat to said failed host's first adjoining neighbor host's first adjoining neighbor; and h) the failed host's second adjoining neighbor host connecting a new heartbeat link to said failed host's first adjoining neighbor host's first adjoining neighbor host by using said remaining connected heartbeat link from failed host's first adjoining neighbor host to the failed host's second adjoining neighbor host and said remaining heartbeat link from the first adjoining neighbor host to the first adjoining neighbor's first adjoining neighbor host;

i) thereby establishing a heartbeat linking structure similar to a heartbeat linking structure prior to the failure of the failed host, with an exception that the failed host is no longer in the structure.

2. The system of claim 1 further comprising a third set of heartbeat links between said multiple hosts connecting hosts with at least two intervening hosts between two heartbeat linked hosts.

3. The system of claim 2 wherein when two adjoining hosts, of said multiple hosts, fail, comprising an ability to use the remaining heartbeat links to re-establish links between adjacent hosts, links between hosts separated by an intervening host, and links between hosts separated by two intervening hosts.

4. A method for connecting heartbeat links between multiple hosts in a networked cluster of hosts comprising:

a. connecting a first set of heartbeat links between said multiple hosts such that each host is connected by said heartbeat link to said host's adjoining neighbor host; and b. connecting a second set of heartbeat links between said multiple hosts such that each host is connected to said host's adjoining host's adjoining host; and c. whereupon the failure of a single host in said networked cluster of hosts leaves a set of surviving hosts and surviving heartbeat links, the surviving hosts using the surviving heartbeat links to re-establish a set of heartbeat links to each adjoining host and to re-establish a set of heartbeat links to each adjoining host's adjoining host;

d. thereby returning the networked cluster of hosts to said networked cluster of host's original state of heartbeat links minus the failed host.

\* \* \* \* \*